Dec. 31, 1929.  P. H. THOMAS  1,741,963
TWO-CIRCUIT TRANSMISSION TOWER
Filed Nov. 20, 1925   2 Sheets-Sheet 1
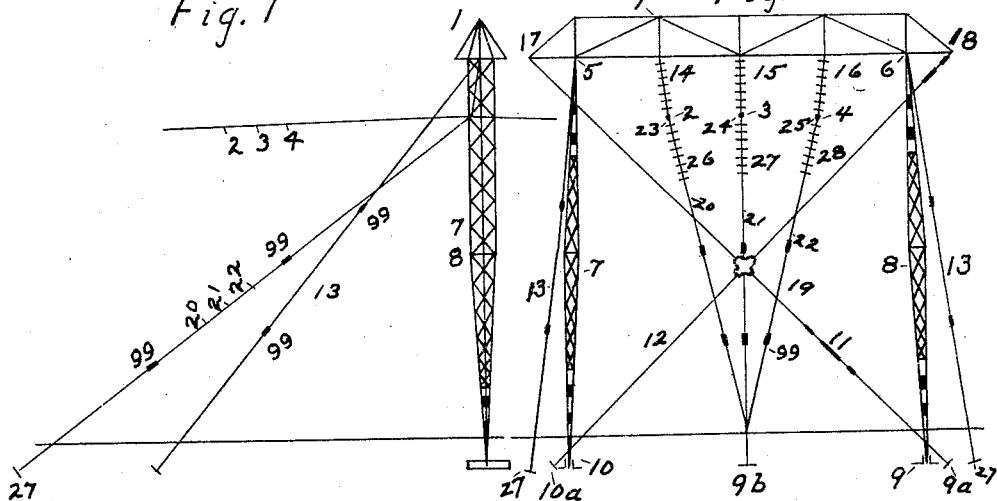
INVENTOR
Percy H. Thomas
WITNESSES Dec. 31, 1929.  P. H. THOMAS  1,741,963
TWO-CIRCUIT TRANSMISSION TOWER
Filed Nov. 20, 1925  2 Sheets-Sheet 2
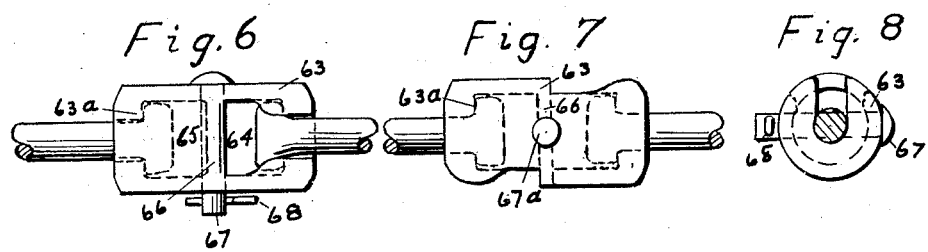
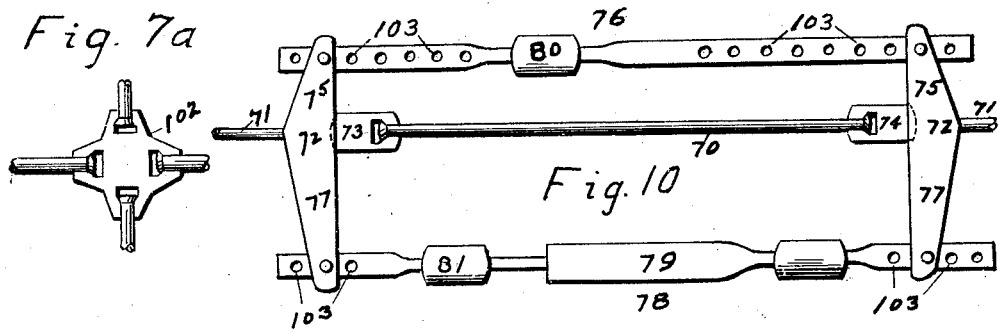
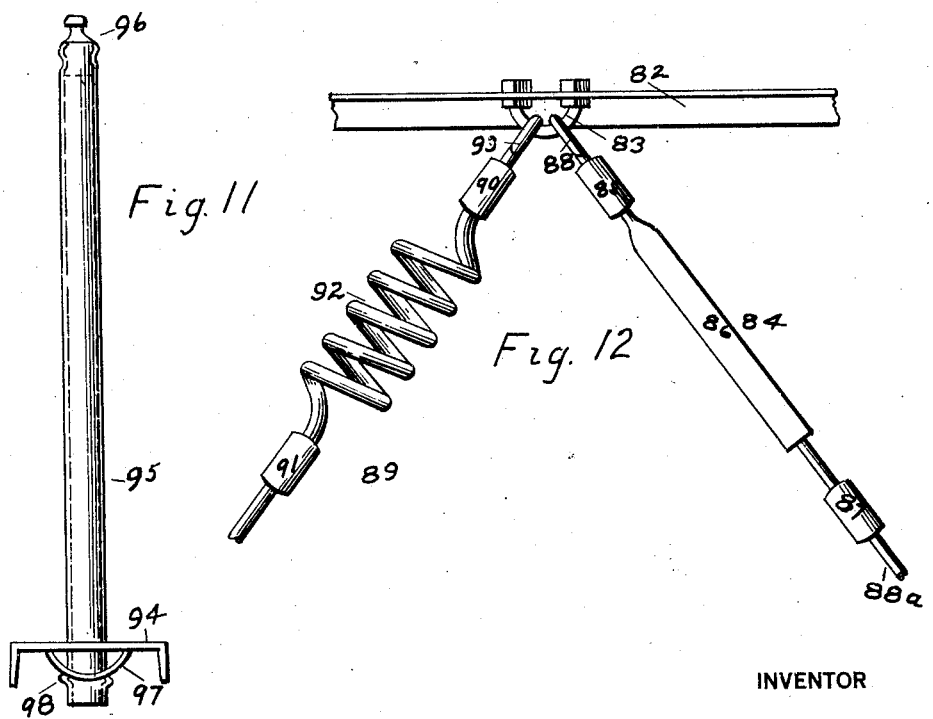
INVENTOR
Percy H. Thomas
WITNESSES Patented Dec. 31, 1929

1,741,963

UNITED STATES PATENT OFFICE

PERCY H. THOMAS, OF UPPER MONTCLAIR, NEW JERSEY

TWO-CIRCUIT TRANSMISSION TOWER

Application filed November 20, 1925. Serial No. 70,297.

My invention relates to transmission towers or other structures such as are used for supporting electric circuits for power transmission, and is suitable for service in general similar to that for which are intended the various transmission structures shown in my patent applications filed October 10th, 1925, Serial No. 61,752, entitled Transmission line towers for electric circuits, and Serial No. 67,159, filed November 5th, 1925, entitled Transmission line towers. In addition to showing certain types of supporting structures herein, I show a number of novel details forming a part thereof and serving to facilitate manufacture, erection, inspection and maintenance—also certain other advantageous features.

In Figs. 1 and 2 I show a tower with a guy attached to each conductor set against pull in one direction along the line, and in Figs. 3, 4 and 5 a tower suited to carry two circuits, and adapted to a narrow right-of-way. In Figs. 6, 7, 7ª and 8 I show a special connecting device to facilitate assembling guys for my towers, and in Fig. 9 a special tension adjusting means. Fig. 10 shows a device for permitting the removal under strain of elements from the guys, and Fig. 11, a special guy anchor. Fig. 12 shows the use of a spring to equalize the tension in the guys of a tower.

In Figs. 1 and 2, 1 is a bridge or cross arm carrying three conductors 2, 3 and 4. This cross arm 1 is supported at the points 5 and 6; Fig. 2, by two posts 7 and 8—the connections at the points 5 and 6 being flexible for motion across the line. The lower ends of the posts 7 and 8 and the attachments to the foundations therefor, 9 and 10, are sufficiently flexible to permit a reasonable amount of motion of the cross arm in any horizontal direction without putting bending moment in the posts, and in general, the tower is so laid out, as is described for the tower of my above identified applications, as to permit all variations of the position of the cross arm due to service conditions, including some slippage or yielding of foundations, without putting bending moment of any serious amount in the posts 7 and 8. This permits a very economical post design.

The cross arm and the tops of the posts 7 and 8 are held against horizontal stresses by transverse guys 11 and 12 and longitudinal guys 13 (one guy only being shown for the sake of clearness). The transverse guys 11 and 12 are connected to extensions 17 and 18 of the cross arm 1 to maintain the proper insulation clearance to the conductors 2 and 4. The guys 11 and 12 meet in the equalizer 19. It will be understood that each post has a pair of oppositely placed longitudinal guys, 13. The conductors are supported by the insulator strings 14, 15 and 16.

In this figure I show the conductors 2, 3 and 4 held against motion toward the right, as shown in Fig. 1 of the drawings, by the guys 20, 21 and 22 attached to the conductors 2, 3 and 4, or to the clamps therefor, 23, 24, 25. Insulator strings 26, 27, 28, capable of taking the full stresses in the guys serve to insulate the conductors from the guys 20, 21 and 22. It is clear that should a stress develop tending to pull any conductor, as for example 2, to the right, Fig. 1, as for example a stress due to the burning off of this conductor to the left of the tower, a stress will develop in the corresponding conductor guy 20. This stress will increase the load in the insulator string 14, but not seriously, if the guy is given a suitable slope, as shown. When there is no unbalanced stress in the conductors, the guys 20, 21, 22 are subjected to very moderate stress. This moderate stress will of course tend to deflect the insulator strings 14, 15, 16 to the left in Fig. 1, and the strings 14 and 16 toward the center of Fig. 2, but this deflection will not be sufficient in amount to cause difficulty, especially as the weight of the conductors tends to keep the insulator string vertical.

This "dead end" guying of the conductor is particularly useful where conductor dropping devices, or when slipping clamps are used, as shown in my patent application filed September 1st, 1925, Serial No. 53,831, entitled Transmission line clamps. These clamps serve to relieve a tower of excessive longitudinal stress in case of the breaking of tightly stressed conductors on one side of the tower, by allowing the conductor to drop free to the ground or to slip through the clamp when such excessive stress develops. Should there be a danger when this dropping or slipping of the conductor occurs, that the conductor may drop from or slip through the clamps on a large number of towers, one after the other, on account of the slack in the conductor produced by the release at any one tower, such a dead ending of the conductors as here described, at suitable intervals, as for example every 10th tower, will stop the dropping or slipping of the conductor. The conductor clamps at the dead ending points must be of such a design as to hold the conductor firmly against all stresses. The clamps 23, 24, 25 supporting the conductors 2, 3, 4 are such clamps.

When desired I may guy the conductor against stress from both directions at the same point but as this involves two guys attached at the same tower an excessive strain may inadvertently be put on the vertical insulator string by too energetic a tightening of the guys.

With the one direction guys of Figs. 1 and 2, any tightening of the guy merely pulls the vertical insulator string out of the vertical position.

$9^b$ is an anchor in the ground to hold the guys 20, 21, 22. An advantage, in addition to simplicity, is gained from the use of a single anchor for all these conductors inasmuch as usually it is not expected that all these conductors will break at once so that the maximum stress on the single anchor will be less than three times the stress that must be provided for when using a different anchor for each guy, or three anchors in all.

It will be noticed in Fig. 2 that the transverse guys 11 and 12 have anchors $9^a$ and $10^a$ separate from and outside of the anchors 9 and 10 of the posts 7 and 8. This has the advantage that the guys make a lesser angle with the horizontal than would be the case were they attached to the post foundations 9 and 10—and further, an added degree of flexibility is secured because a sinking of the post foundation does not pull on the adjacent guy.

Longitudinal guys in pairs 13—13 are shown for each post. The anchors for these guys 27 are placed somewhat outside the line of the post foundations to develop a certain transverse resistance in the longitudinal guys in case of movement of the cross arm across the line. The guys are shown as made up of lengths of rod or cable connected together by special devices 99, such as the connectors 63 illustrated in Figs. 6, 7 and 8, so that the guys may be shipped in parts and assembled on the site. The same connecting devices may be used for connecting various other parts of the structure, such as eyes or anchors.

In Figs. 3, 4, 5 is shown a tower in which the cross arm is shown at 28 and two posts at 29 and 30, these being hinged or connected so as to be somewhat flexible across the line at the points 31 and 32. A set of guys 33, 34, 35, 36 taken with the strut 37, flexibly connected at its ends to the posts 29, 30 serve to restrain the tower against transverse motion. These guys in pairs are connected to stress equalizers, as shown at 38, 39. By making the connections between the strut and the posts 29 and 30 flexible any bending moment in either structure is avoided even should the guys not be properly adjusted and a certain looseness exist, or should distortion occur.

This tower is shown as standing on uneven ground and the post on the lower side is carried on a tripod 40 to give the effect of level ground. This tripod 40 which is partially buried in the ground, may be replaced by a concrete pillar or any other suitable support. The transverse guy 36 may be carried down under ground and fastened to the tripod. Longitudinal guys are shown at 41—41, Fig. 3.

The cross arm 28 is adapted to support 6 conductors for two circuits—three conductors 42, 43, 44 for one circuit above the three 45, 46, 47 for the other circuit. This construction is especially suitable where no sleet is to be considered. It is economical of steel and requires only a narrow right-of-way. The cross arm 28 has two conductor supporting trusses 49 and 50. The truss 49 supports most of the weight of all conductors and takes the longitudinal pull of the lower three 45, 46, 47. The struts 53 transfer the dead weight load of the upper truss at intermediate points to the lower and serve to fix the truss 50 against vertical movement. The truss 50 takes the longitudinal pull of the conductors 42, 43, 44. The truss 50 is supported by the vertical trusses 51 and 52, which are rigidly connected to the truss 49 and which serve to carry the bending moment introduced by unbalanced longitudinal stresses from any of the conductors. This bending moment is transferred to the posts 29 and 30 which must be made of sufficient strength to resist it. The longitudinal guys 41 are attached to the points 54, as shown in Figs. 3 and 5. By attaching the longitudinal guys at a point on the trusses 51 and 52 intermediate between the trusses 49 and 50, the bending moment introduced by the breaking of conductors is rendered a minimum. It is very much smaller than the moment developed by broken conductors when no guys are used, as in the style of tower now in general use. I show ground wires 100—100 on the cross arm 28 connected at the points 54—54, where they tend to support the tower in case of the breaking of a longitudinal guy 41, though the ground wire takes little stress from the longitudinal guys normally on account of the slack due to its long span and sag. The ground wires may be connected at the ends of the truss 50.

The transverse guys 33 and 34 are attached to the trusses 51 and 52. The general features of the tower of Figs. 3, 4, 5 such as flexibility of connections, avoiding of unnecessary bending moment in the posts, etc. are the same as in the case of Figs. 1 and 2.

Fig. 4 is a plan view of the cross arm 28, showing particularly those members taking up longitudinal stresses, which are shown as the same in trusses 49 and 50. Some of the other bracing on the ends also is shown in this figure.

The conductors are each hung from two insulator strings 55—55 connected in V as shown. This serves to prevent side swinging but permits longitudinal movement of the insulator string; it permits a much narrower tower than would otherwise be possible.

Fig. 3 shows the end view of the tower and the trusses 51 and 52, the conductors and insulators being omitted for clearness.

In Fig. 9, I show a device for tightening or adjusting the length of the guys in my tower. When the tower has been erected and before the foundations are back filled it will often be desirable to readjust the lengths of the guys slightly, and to tighten them to the proper degree. This may be accomplished by the tightening device shown in which 101 is a screw, preferably made of rust resisting material, running in a nut 56 of bronze or other suitable material. The threaded part of the screw 101 and the nut 56 are located within a tube 57 which may be of galvanized iron. This tube is closed at the upper end by a plug 58 with a knob 59 on the end provided for purposes of connection to the guy rod. The metal of the wall of the tube 57 is spun or forced into grooves in the plug 58, as shown at 60 —both to make a tight joint and to enable the main stress to be transmitted from the knob 59 to the tube 57. Similarly the wall of the tube 57 is pressed or spun into a groove in the nut 56, shown at 60 which fixes the nut in position and prevents its turning around in the tube. This construction gives protection from the weather for the screw and nut. The screw 101 is extended outside the tube 57, through a portion 61, which is made four or six sided to serve for the purpose of permitting the use of a wrench to turn the screw 101, to a second knob 62 used as a means of attachment. With this device connected in series with a guy, any desired tension may be obtained by turning the screw 101 and holding the tube 57 from turning. Sometimes I prefer to omit the squared portion of the screw 101 to prevent tampering with the adjustment. The screw may then be turned by a Stillson or other suitable wrench. With this device, as described, there will be no serious sticking of the screw threads even after a long period of time.

I do not mean to limit myself to all the details shown in this adjusting device but to claim broadly the fundamental characteristics as far as they are novel—however applied.

In Figs. 6, 7, 7ª and 8, I show a "knob" connection device which is useful in connection with the erection and maintenance of these towers. Since many of the guys that are provided for these towers will be long, in some cases upwards of 75 feet, it is necessary to cut them into convenient lengths for transportation. These lengths may then be connected together by the knob connection device here shown, in which 63 is the main body portion, being generally cylindrical in form with rounded ends and having two reentrant recesses 64 and 65, one near each end. These recesses, which are circular in cross section and symmetrical about the long axis of the main body part 63, have openings, one on each side of the main body portion, so that the end of a guy or other rod with a knob or button on the end may be inserted. They are reentrant, however, so that when once this knob has been inserted it may be pulled backward along the long axis of the body portion 63 until a suitable seat 63ª for the shoulder of the knob is reached, on which the knob fits and which may be used to transmit heavy longitudinal stresses. The main body portion 63 is so shaped that in this position the knob cannot be removed sideways and is locked in place. When rods with knobs have been inserted in both ends a bolt 67 may be inserted in the hole 67ª, Fig. 7, provided between the recesses, so that the rods or knobs cannot retreat sufficiently to be able to escape from the recess. The bolt 67 may be held by a cotter pin 68. The bolt is omitted in Fig. 7 for clearness. Thus there is formed by rods and suitable knob-connections a flexible, strong and readily assembled guy. I may also use this connector for inserting into the guy various other apparatus as may be convenient, the requisite being that the apparatus to be connected shall be provided with the proper knob for inserting in the recess of the knob-connector.

Fig. 6 shows a plan, Fig. 7 an elevation and Fig. 8 an end view of the knob-connector. I prefer to provide a diaphragm or stiffening rib 66 between the two recesses to add to the strength. I place the recess openings for the insertion of the knobs on opposite sides of the main body piece 63 to add to its mechanical stiffness. These recesses may, however, open on the same side and the added stiffness be secured otherwise.

Fig. 7ª shows a modification of the knob-connections suitable for connecting four rods—similar to the stress equalizers 38 and 39 of Fig. 5. The principles of construction are the same as for Figs. 6, 7 and 8. A recess is provided in the main body portion 102 for each rod and all the rods may be inserted in their recesses, pulled home and then will be locked in place as with the two rod embodiment.

Fig. 10 shows a clamping device useful for removing from a guy lengths of rod or other apparatus under strain. The length of rod 70 is taken as under strain in the guy 71. The two grips 72—72 are placed against the knob-connectors 73, 74. They are so shaped as to be able to rotate slightly on round ends of the knob-connectors 73 and 74. One set of arms 75—75 for said grips is connected by the adjustable link 76 while a second set of arms 77 is connected by the adjustable link 78, which contains a length adjusting device 79 such as the tightening device of Fig. 9. By operating the adjusting device 79, the strain may be taken off the guy length 70 and another inserted of the same or different length, up to the limits of the adjusting device. On account of the insertion of the knob-connectors 80 and 81—additional lengths of rod may be introduced in the links 76 and 78 to permit extensions. These links are provided with series of holes 103—103—103 to permit adjustments of length.

Fig. 12 shows a detail for connecting the two longitudinal guys to the top of a post, for example the post 7 of Fig. 2. 82 is a horizontal angle forming part of the cross arm and post top and 83 a U bolt attached to the top flange thereof. 84 is one guy containing as a part thereof the knob-connectors 87 and 85, the tightening device 86 such as the device 57 illustrated in Fig. 9 the eye 88 and the necessary rod lengths 88ª below. The opposing guy 89 contains the knob-connectors 90 and 91 and a heavy tension spring 92, as well as the eye 93 and the other parts. The purpose of the spring 92, the stiffness of which is adapted to hold the maximum stress in the guy, is to prevent undue pressure being thrown on the tower by too tight adjustments, by expansion and contraction with heat and cold, etc. Tension adjustments on one side of the post automatically determine the tension adjustments on the other side. They will be accompanied by a certain movement of the post top, with the change in length of the guy 84.

While this use of the spring 92 will often be of advantage, in many lines there will be no necessity for any such spring, since, the natural flexibility and elasticity of the guys and connections will take up all such variations of stress.

Fig. 11 shows a guy anchor especially adapted to the tower shown herein. 94 is a short length of channel acting as a dead man underground. 95 is a pipe or tube serving as a tension member adapted to bring the stress from the guy down to the channel 94. 97 is an auxiliary bell shaped piece useful in the case of a wide channel to distribute the stress over the channel web. This piece 97 may be omitted where the stresses are not too heavy. The lower end of the pipe 95 has a ring or ridge 98 expanded around it from the inside which takes the place of a nut to prevent the pipe from pulling through the channel. This ring 98 bears against the piece 97, or against the web of the channel when the piece 97 is omitted.

The upper end of the pipe 95 is spun or pressed into grooves around the plug 96, which serves as a connection for attachment of the guy through a knob-connector, or otherwise. This guy anchor is very economical of material and labor and is strong and flexible. I prefer to fill the pipe with concrete, to make it stiffer and to prevent internal corrosion.

While in this application I have shown many details as used in definite places in specific structures, I desire it understood that I may use any of the various devices at any points where suitable whether here so shown or not, without departure from the invention, provided the same function is performed in the same way.

I claim as my invention—

1. A two circuit transmission tower comprising a plurality of vertical supporting posts, a double cross arm mounted on said posts, including two trusses on different levels, each capable of taking longitudinal stress, two vertical connecting members, located at the ends of the cross arm, supporting the upper truss above the lower and capable of resisting bending moment in a vertical plane, parallel to the line, one of said trusses being designed for supporting between the posts, the vertical load of both trusses, connections between said posts and cross arm, said connections being flexible transversely and capable of taking bending moment longitudinally, and transverse guys connected to said connecting members and longitudinal guys also connected to said connecting members but at a point vertically intermediate between said trusses.

2. A double circuit transmission tower, including two separate conductor supports, rigidly connected and located in two planes, one above the other, each support capable of taking longitudinal stresses, with one of said supports being designed for taking up between the posts the vertical load of both, vertical posts under said conductor supports at the ends, said posts being designed to take bending moment due to longitudinal stresses from said conductors and being connected to said conductor supports flexibly in a transverse direction—together with guys fixing the position of said conductors' supports, including transverse guys attached to the lower conductor support and longitudinal guys attached at a level intermediate between the levels of said conductor supports.

3. In a transmission tower, a plurality of posts spread apart, line conductors located in a plurality of planes, one above another, an overhead supporting means for the conductors lying in any one plane, said supporting means being capable of resisting all longitudinal stresses from its conductors, rigid connections between said supporting means, and guys for supporting the longitudinal stresses on the tower, as a whole, said guys being connected to the tower at a level intermediate between the top and the bottom conductor supports together with transverse guys connected near the tops of said posts.

4. A transmission line tower comprising a rigid crossarm carrying conductors and ground wires attached in two horizontal planes, one above the other, foundations for said tower, supporting posts under said crossarm on both sides of the center, taking up downward stresses, connections between said posts and said crossarm rigid and capable of taking bending moment in a longitudinal plane but flexible for movement in a transverse plane, flexible connections between said posts and said foundations, and longitudinal guys in pairs attached to said crossarm at a level intermediate between the levels of the two attachment planes, together with transverse guys connected to said crossarm, restraining transverse movement of said crossarm.

5. In a transmission line tower a rigid crossarm adapted to carry conductor and ground wire cables in two or more planes, rigid posts under said crossarm on both sides of the center taking up downward stresses, connections for said posts, top and bottom, permitting limited movements of said crossarm in any direction, without causing bending moments in said posts, and additional means for restraining the movement of said crossarm as follows, against transverse movement on said posts, transverse guys attached to said crossarm, and against longitudinal movement, guys in pairs attached to said crossarm at points intermediate of the cable carrying planes, thus minimizing bending moments between broken cables and the longitudinal guys, the residual bending moment being taken up by the stiffness of the posts in a longitudinal plane.

6. A transmission line tower comprising a rigid crossarm, carrying conductors and ground wires and having two cable attachment planes, one above the other, the ground wires being attached in the upper plane, posts and foundations under said crossarm on both sides of the center and flexible connections for the posts freeing them from bending moment due to limited movements of said crossarm, together with longitudinal guys to take up longitudinal stresses on said crossarm, said guys being attached to said crossarm at a point between said planes of attachment thus minimizing bending moments due to longitudinal load stresses resisted by said guys, the residual bending moments in the longitudinal plane being taken up by said posts, and transverse guys to resist transverse load stresses.

7. A transmission line tower, comprising a rigid crossarm, carrying conductor and ground wire cables and having a plurality of planes of attachment for said cables, one above another, rigid posts under said crossarm on both sides of the center, framed to said crossarm to take bending moment in a longitudinal plane and to permit limited movement transversely, and longitudinal guys for taking up longitudinal load stresses, connected to said crossarm in pairs, the ground wires and the longitudinal guys being connected substantially over the posts, together with transverse guys for taking up transverse load stresses.

8. A transmission line tower, comprising a rigid crossarm, carrying conductor and ground wires cables and having a plurality of planes of attachment for said cables, one above another, rigid posts under said crossarm on both sides of the center, framed to said crossarm to take bending moment in a longitudinal plane and to permit limited movement transversely, and longitudinal guys for taking up longitudinal load stresses, connected to said crossarm in pairs, the ground wires and the longitudinal guys being connected at points between the upper and the lower attachment planes, together with transverse guys for taking up transverse load stresses.

PERCY H. THOMAS.